United States Patent
Ito et al.

(10) Patent No.: US 6,301,383 B1
(45) Date of Patent: *Oct. 9, 2001

(54) IMAGE PROCESSING APPARATUS AND METHOD

(75) Inventors: Masahiko Ito, Tokyo; Naoya Katoh, Chiba, both of (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/925,678

(22) Filed: Sep. 9, 1997

(30) Foreign Application Priority Data

Sep. 10, 1996 (JP) ................................... 8-238760

(51) Int. Cl.[7] ..................................... G06K 9/00
(52) U.S. Cl. ..................... 382/162; 382/167; 358/518; 358/520
(58) Field of Search .................. 382/162, 167; 358/518, 520, 523

(56) References Cited

U.S. PATENT DOCUMENTS 5,450,216  9/1995  Kasson ................... 358/518
5,692,071  * 11/1997  Govaert ................. 382/167

FOREIGN PATENT DOCUMENTS 08016784  1/1996  (JP).

OTHER PUBLICATIONS

A.M. Khalfin, "Foundations for television Technique", textbook, Publishing House "Soviet Radio", p. 536, 1955.*
J.C. Russ, "The image processing handbook", 2nd ed., CRC Press, Inc., p. 126, 1995.*
N. Katoh and M. Ito, Gamut Mapping for Computer Generated Images (II) The Fourth Color Imaging Conference: Color Science, Systems and Applications, pp. 126–129.

* cited by examiner

Primary Examiner—Phuoc Tran
(74) Attorney, Agent, or Firm—Ronald P. Kananen; Rader, Fishman & Grauer

(57) ABSTRACT

Image processing apparatus and method converts an image in a predetermined input system to an image corresponding to a color gamut obtained by a predetermined output system. In the image processing apparatus and method a CPU converts signals in a color space which does not depend on a device to signals CMY (consisting of cyan (C), magenta (M) and yellow (Y)) corresponding to a printer by referring to a lookup table, and outputs the signals to the printer 4 via an interface. On the lookup table stored in a ROM there are registered the values of signals CMY corresponding to the values of signals L*a*b*. The values of signals CMY within a gamut in which the value ΔE of a color-difference formula are minimized are used as the values of the signals CMY corresponding to the signals L*a*b*, which are mapped outside the gamut of the signals CMY.

6 Claims, 15 Drawing Sheets

FIG. 5

| C M Y | L*a*b* |
|---|---|
| 0    0    0   | 95    0    0 |
| 0    0    8   | 94    0    2 |
| 0    0    16  | 93    0    6 |
| ⋮ | ⋮ |
| 0    0    255 | 85    9    100 |
| 0    8    0   | 92    2    −9 |
| ⋮ | ⋮ |
| 0    8    255 | 76    13   90 |
| 0    16   0   | 92    5    −19 |
| ⋮ | ⋮ |
| 0    255  255 | 41    19   −52 |
| 8    0    0   | 93    −5   −2 |
| ⋮ | ⋮ |
| 255  255  255 | 7     0    0 |

FIG. 8

| L* a* b* | C M Y |
|---|---|
| 0  −128 −128 | 0    0    0 |
| 0  −128 −120 | 2    4    2 |
| 0  −128 −112 | 3    5    2 |
| ⋮ | ⋮ |
| 0  −128  128 | 4    2    3 |
| 0  −120 −128 | 2    5    3 |
| ⋮ | ⋮ |
| 0  −120  128 | 5    3    2 |
| 0  −112 −128 | 2    5    4 |
| ⋮ | ⋮ |
| 0   128  128 | 8    5    4 |
| 3  −128 −128 | 3    8    5 |
| ⋮ | ⋮ |
| 100  128  128 | 254  253  252 |

IMAGE PROCESSING APPARATUS AND METHOD

BACKGROUND OF THE INVENTION

1. Field of the Invention

The present invention relates to image processing apparatuses and methods, and in particular, to image processing apparatus and method in which, when the color gamut (hereinafter referred to as the "gamut") of an output system is narrower than the gamut of an input system, colors close to colors obtained by the input system can be outputted by compressing the gamut of color signals outside the gamut of the output system in the direction along which the value of a color-difference formula decreases to its minimum.

2. Description of the Related Art

Recently, with the price reduction and speed increase of electronic devices, desktop publishing (DTP) has become widespread, and various electronic devices for processing color images are used.

In many cases, such electronic devices have different gamuts (color-reproduction ranges) which can be expressed in accordance with the types thereof. Thus, the concept of "device independent color" for expressing a predetermined image with identical colors by a plurality of electronic devices is on the point of being introduced.

The concept of device independent color is realized as a color management system (CMS).

As shown in FIG. 12, when color signals from a predetermined input system (video camera 61, scanner 62, monitor 63 or the like) are converted to color signals for a predetermined output system (monitor 63, printer 64 or the like), the color signals from the input system are temporarily converted (profiled) to signals in a color space (CIE (commission internationale de l'eclairage)/XYZ, CIE/L*a*b*, etc.) which does not depend on a device by using a predetermined conversion formula or conversion table (profile), and the converted color signals are converted to the color signals for the output system.

For example, when the monitor is used as an input system, and the printer is used as an output system, as shown in FIG. 13, red, green and blue signals corresponding to the monitor are initially converted to color signals CIE/XYZ or CIE/L*a*b*, which do not depend on the device by using a profile corresponding to the monitor. The converted color signals which do not depend on the device are converted to printer color signals CMY by using the profile corresponding to the printer.

Concerning methods for profiling, a method using a physical model like a conversion matrix, a method using a lookup table (LUT), a method using a neutral network, and so forth have been devised.

In the above manner the CMS converts color signals from a predetermined input system to color signals for a predetermined output system. When the gamut of the input system is broader than the gamut of the output system, it is impossible for the CMS to convert in identical colors the color signals from the predetermined input system to the signals for the predetermined output system.

For example, the monitor performs color reproduction with an additive mixture of colors by causing three-primary-color (red, green and blue) phosphors to produce colors. The printer performs color reproduction at a predetermined gradation on a recording medium such as paper by a subtractive mixture of colors with four types of ink: cyan, magenta, yellow and black. As shown in FIG. 14, the gamut of the printer 64 is narrower than (different from) the gamut of the monitor 63. Consequently, in the figure the colors in hatched ranges on the monitor 63 cannot be reproduced by the printer 64.

Accordingly, in such a case, color signals from the monitor are converted to signals within the gamut of the printer by performing color-gamut mapping (hereinafter referred to as "gamut mapping"), with the original image information (gradation, tones, and so forth) maintained as much as possible.

The gamut mapping is performed in a color space which does not depend on a device, and is normally performed, particularly in a CIE/L*C*h color space (color space formed by converting an L*a*b* color space to polar coordinates) corresponding to human visual characteristics. In the CIE/L*C*h, L*, C* and h represent lightness, chroma and hue, respectively.

Conventionally, when gamut mapping is performed, hue is fixed in a CIE/L*C*h color space, and lightness and chroma are compressed on a two-dimensional plane comprising lightness and chroma.

For example, there are a number of methods: a method (as shown in FIG. 15) decreasing (compressing) only chroma while fixing lightness and chroma; a method (as shown in FIG. 16) determining the lightness and chroma of output color signals so that the sum of the lightness-difference square and the chroma-difference square in input color signals and output color signals is minimized while fixing hue.

According to the above-described method in which gamut mapping is performed while fixing hue, lightness or chroma is greatly compressed, problems occur because compression of lightness decreases contrast and a stereoscopic effect of an image, and a deterioration in chroma decreases brightness to form an image from which an impression cannot be made.

Therefore, when the above-described color-gamut mapping is performed with respect to an image which has very high chroma and is stereoscopic such as a CG (computer graphics) image, considerable characteristics of the image are lost.

SUMMARY OF THE INVENTION

Accordingly, it is an object of the present invention to provide an image processing apparatus and method in which, when a gamut obtained by an output system differs from a gamut obtained by an input system, color signals for the output system which are recognized to resemble color signals in the input system are generated by performing gamut mapping in the direction along which the value of a color-difference formula is minimized.

According to a first aspect of the present invention, the foregoing object has been achieved through an image processing apparatus for converting an image in a predetermined input system to an image corresponding to a gamut obtained by a predetermined output system, wherein the image processing apparatus includes gamut-mapping means in which, when the gamut obtained by the output system differs from a gamut obtained by the input system, gamut mapping is performed with respect to color signals outside the gamut of the output system in the direction along which the value of the following color-difference formula is minimized:

$$\Delta E = \{(\Delta L^*/K_L)^2 + (\Delta C_{ab}^*/K_C)^2 + (\Delta H_{ab}^*/K_H)^2\}^{1/2}$$

where $\Delta L^*$, $\Delta C_{ab}^*$ and $\Delta H_{ab}^*$ represent a lightness difference, a chroma difference and a hue difference, respectively, and $K_L$, $K_c$ and $K_H$ represent predetermined constants, respectively.

Preferably, the $K_L$, $K_c$ and $K_H$ have the following relationships: $K_c \geq K_H$ and $K_c \geq K_L$.

According to a second aspect of the present invention, the foregoing object has been achieved through an image processing method for converting an image in a predetermined input system to an image corresponding to a gamut obtained by a predetermined output system, wherein the image processing method includes a step in which, when the gamut obtained by the output system differs from a gamut obtained by the input system, gamut mapping is performed with respect to color signals outside the gamut obtained by the output system in the direction along which the value of the following gamut formula is minimized:

$$\Delta E = \{(\Delta L^*/K_L)^2 + (\Delta C_{ab}^*/K_c)^2 + (\Delta H_{ab}^*/K_H)^2\}^{1/2}$$

where $\Delta L^*$, $\Delta C_{ab}^*$ and $\Delta H_{ab}^*$ represent a lightness difference, a chroma difference and a hue difference, respectively, and $K_L$, $K_c$ and $K_H$ represent predetermined constants, respectively.

According to the present invention, when a gamut obtained by an output system differs from a gamut obtained by an input system, gamut mapping is performed with respect to color signals outside the gamut obtained by the output system in the direction along which the value of the following gamut formula is minimized:

$$\Delta E = \{(\Delta L^*/K_L)^2 + (\Delta C_{ab}^*/K_c)^2 + (\Delta H_{ab}^*/K_H)^2\}^{1/2}$$

where $\Delta L^*$, $\Delta C_{ab}^*$ and $\Delta H_{ab}^*$ represent a lightness difference, a chroma difference and a hue difference, respectively, and $K_L$, $K_c$ and $K_H$ represent predetermined constants, respectively. Thus, color signals for the output system are recognized to be color signals for the input system.

BRIEF DESCRIPTION OF THE DRAWINGS

FIG. 5 is a chart showing an example of a forward-direction table.

FIG. 8 is a chart showing an example of a lookup table.

DESCRIPTION OF THE PREFERRED EMBODIMENTS

Figure 1:
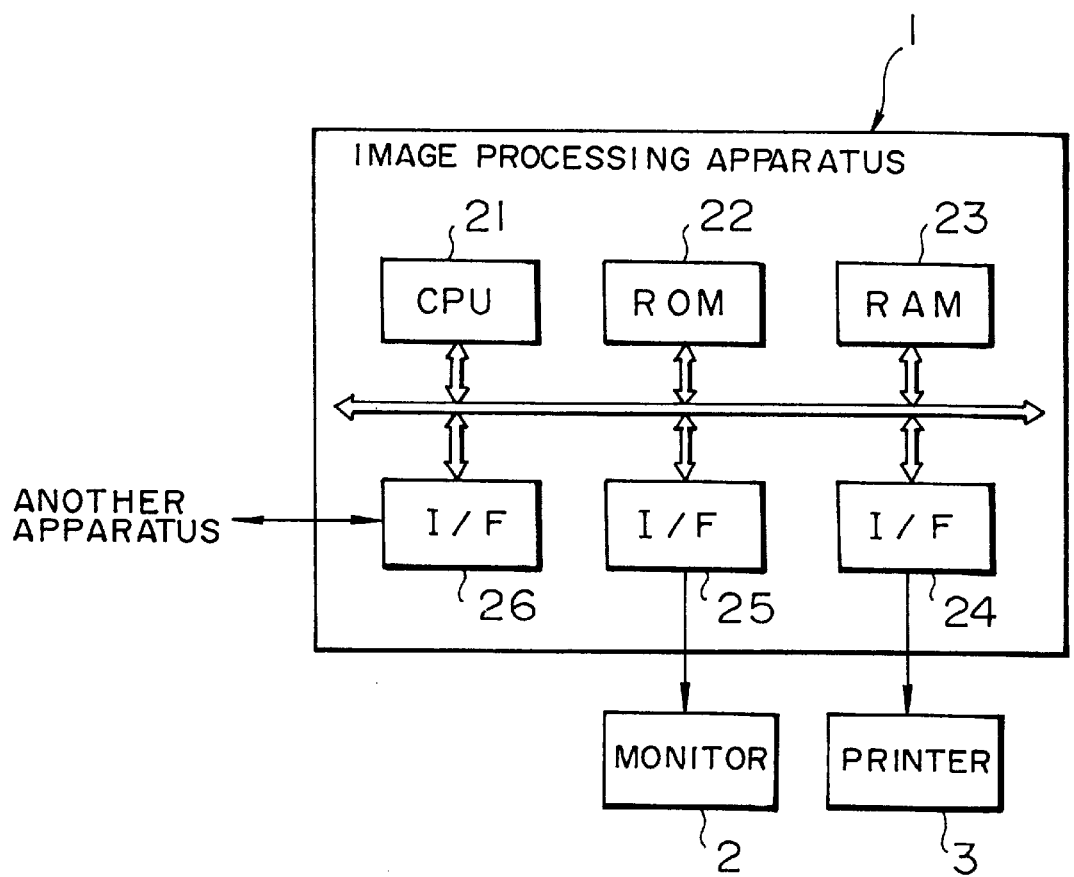
FIG. 1 is a block diagram showing an image processing apparatus according to an embodiment of the present invention.

FIG. 1 shows an image processing apparatus according to an embodiment of the present invention. This image processing apparatus 1 stores predetermined image data as color signals in a device-independent color space, and converts the color signals in the color space which does not depend on the device to color signals corresponding to an output device such as a monitor 3, a printer 4 or the like.

In the image processing apparatus 1, a CPU (gamut-mapping means) 21 performs various types of processing in accordance with programs previously stored in a ROM 22. For example, color-signal conversion between the color space which does not depend on the device and the color space of a predetermined device is performed.

The ROM 22 holds programs in which the operation of the CPU 21 is described, a lookup table for use in color-signal conversion, and so forth.

The RAM 23 temporarily holds predetermined data and programs in accordance with processing by the CPU 21.

An interface 24 is designed to output to a printer 4, signals supplied from the CPU 21.

An interface 25 is designed to output to a monitor 3, signals supplied from the CPU 21.

An interface 26 is designed to output to the CPU 21, signals supplied from another unit (not shown), and to output to the other unit, signals supplied from the CPU 21.

Next, a process for the image processing apparatus 1 shown in FIG. 1 will be described with reference to a flowchart shown in FIG. 2.

At first, in step S1, the CPU 21 in the image processing apparatus 21 receives red, green and blue signals from, for example, another unit via the interface 26.

In the subsequent step S2, the CPU 21 converts the red, green and blue signals to signals (signals L*a*b*) in a color space (CIE/L*a*b*) which do not depend on a device, and stores them in the RAM 23 in step S3.

In step S4, the CPU 21 reads the signals L*a*b* stored in the RAM 23, and converts the read signals to signals CMY (signals consisting of cyan (C), magenta (M) and yellow (Y)) corresponding to the printer 4 while referring to a lookup table (profile) described below. In step S5, the CPU 21 outputs the converted signals CMY to the printer 4 via the interface 24.

In the above manner the CPU 21 converts signals in a color space which does not depend on a device to signals corresponding to the device, and outputs the converted signals to the device.

Next, the lookup table stored in the ROM 22 will be described. When making the lookup table used when signals L*a*b* are converted to signals CMY, a forward-direction table is initially made by calculating signals L*a*b* with respect to signals CMY in the color space of signals CMY. Subsequently, an inverse mapping table (showing the values of signals CMY corresponding to the values of signals L*a*b* in the gamut of signals CMY) with respect to the forward-direction table is made. Finally, the lookup table used when signals L*a*b* are converted to signals CMY is made by utilizing gamut mapping to determine signals CMY corresponding to signals L*a*b* which are not defined by the inverse mapping table, namely, the values of signals CMY corresponding to signals L*a*b*, which are inversely mapped outside the gamut of signals CMY.

Figure 3:
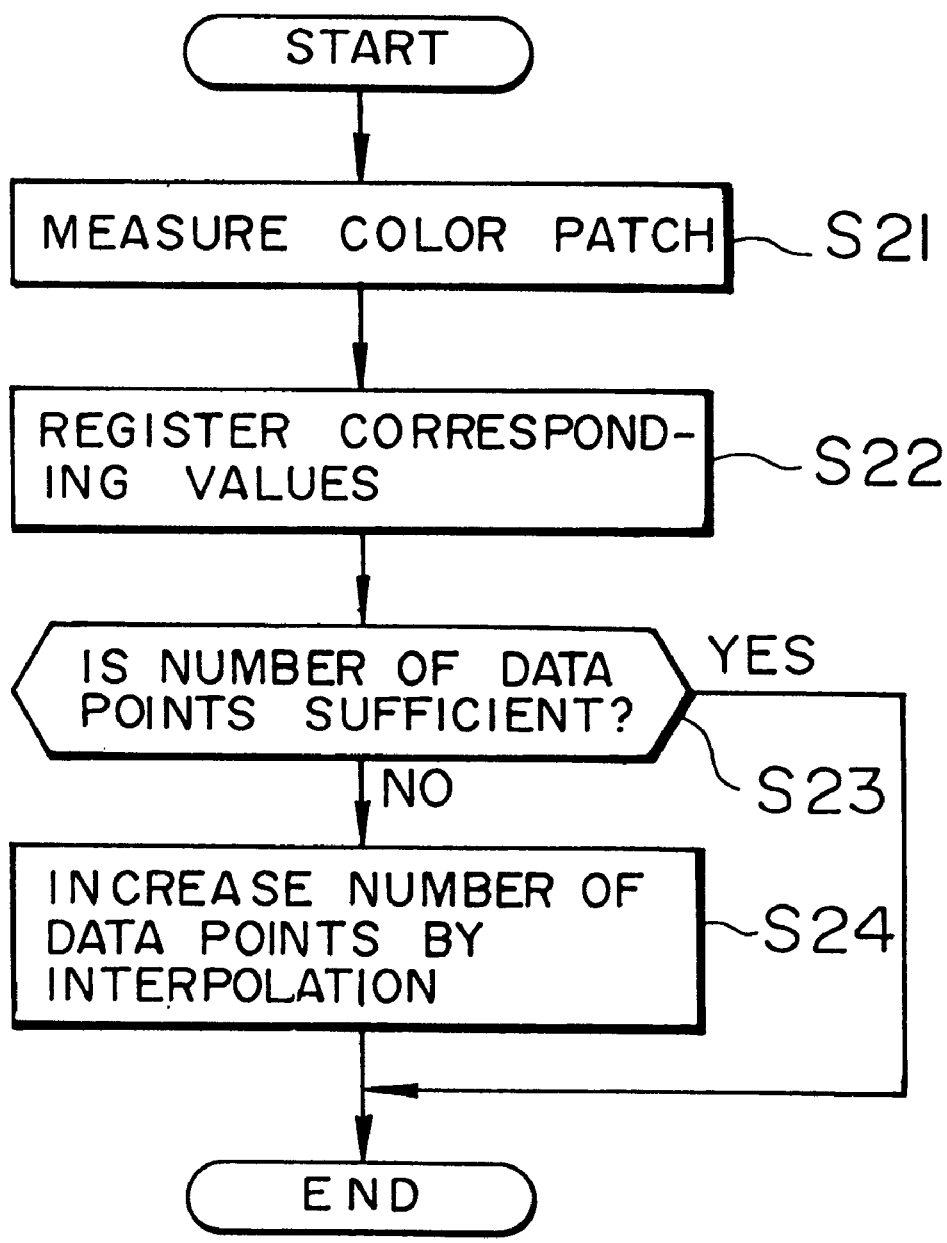
FIG. 3 is a flowchart illustrating a process for making a forward-direction table.

At first, the making of the forward-direction table will be described with reference to a flowchart in FIG. 3.

In step S21, by changing the level of each component of signals CMY within the limits of 1 and N, N×N×N color patches are made. The color values (namely, the values of signals L*a*b*) of each color patch are measured using a spectrophotometer or the like.

In the subsequent step S22, concerning each color patch, the correspondence between the value of each component of signals CMY and the values of signals L*a*b* is registered on the forward-direction table.

Figure 4:
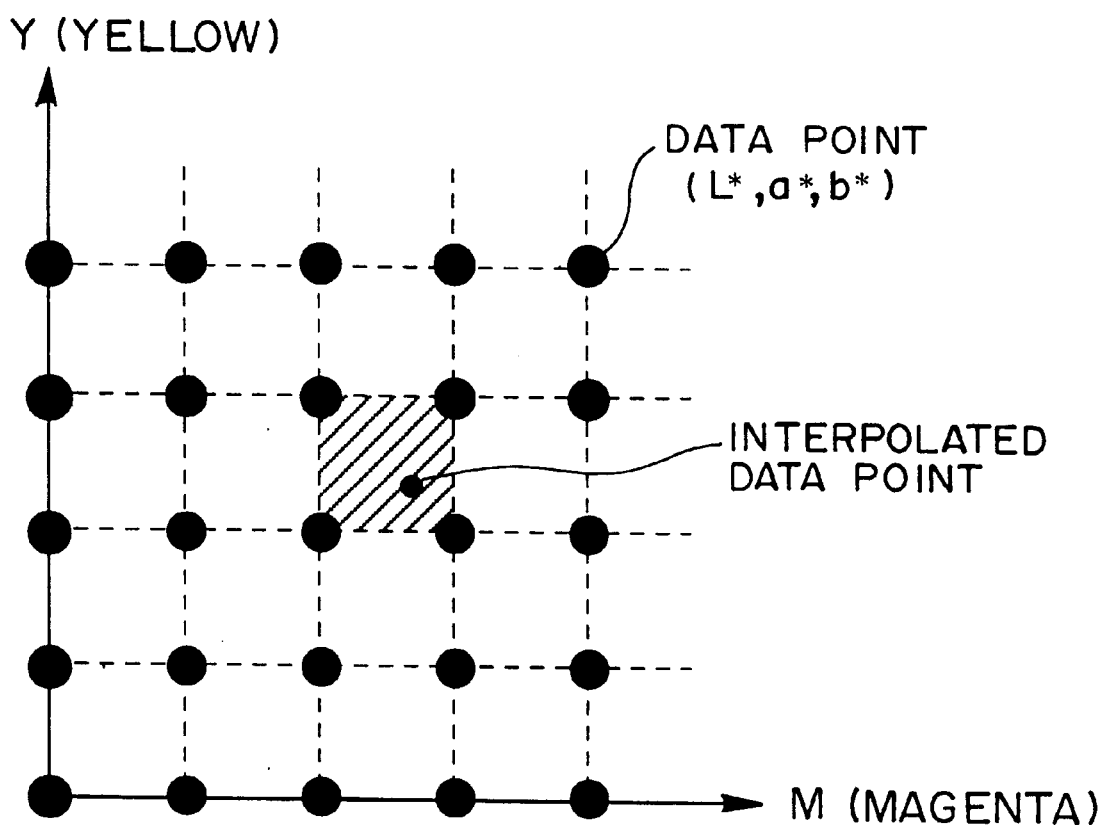
FIG. 4 is a chart showing an example of a data point interpolated on an M–Y plane.

In step S23, the process determines whether or not the number of data (namely, the number of the correspondences between signals CMY and signals L*a*b*) is sufficient. If the process has determined that the number is sufficient, it stops generating the forward-direction table. If it has determined that the number of data is not sufficient, the number of data is increased by interpolating the correspondence at a predetermined point from surrounding data points to form a new data point as shown in FIG. 4 in step S24, and a forward-direction table as shown in FIG. 5 is generated.

In the forward-direction table shown in FIG. 5 there are registered the component values of signals L*a*b*, corresponding to signals CMY in which the value of each component is any of 1 to 255.

Figure 6:
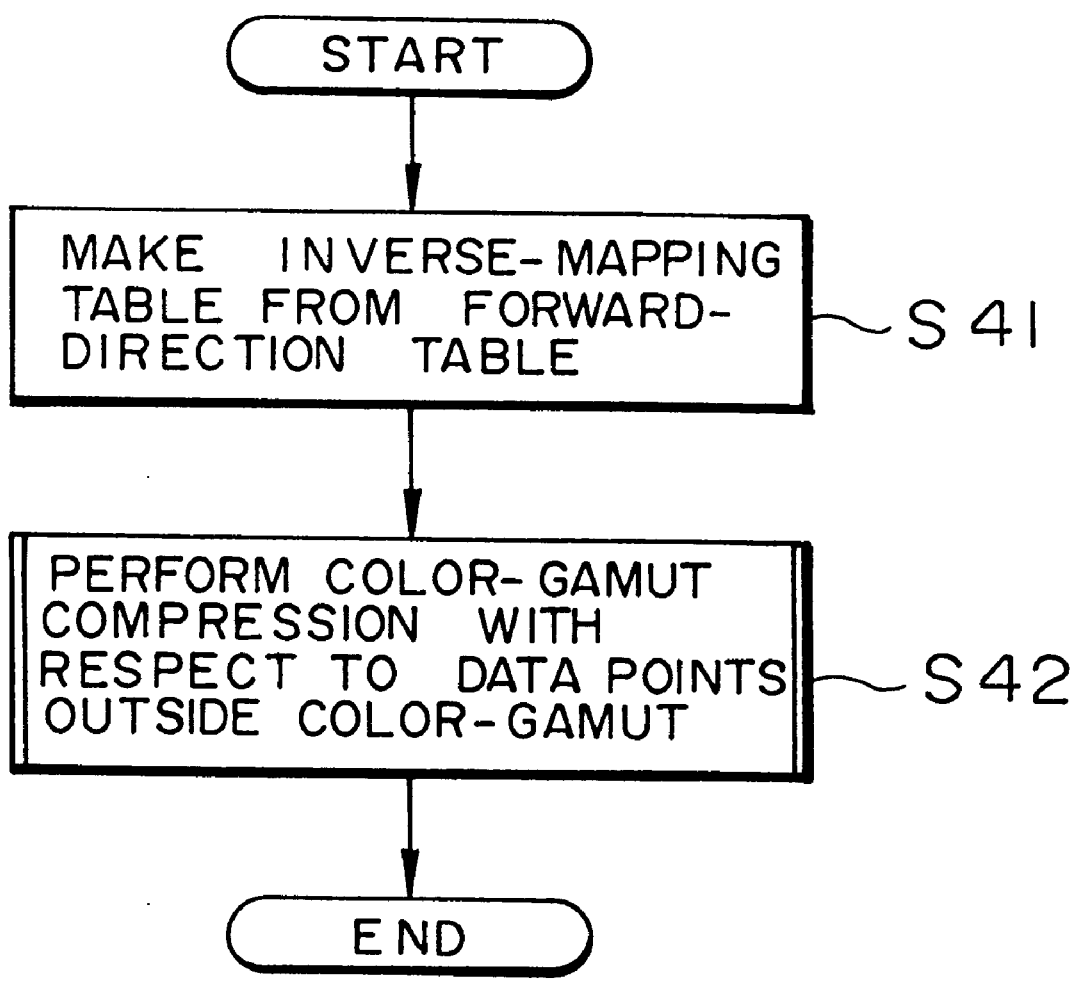
FIG. 6 is a flowchart illustrating a process for making a lookup table.

Generating the lookup table used when signals L*a*b* are converted to signals CMY will be described with reference to flowcharts in FIGS. 6 and 7.

In step S41, an inverse mapping table is made from the above-described forward-direction table. In other words, a table which includes the values of signals CMY corresponding to the values of signals L*a*b* in the gamut of signals CMY is made.

In the subsequent step S42, the lookup table is formed by adding to the inverse mapping table the values of signals CMY corresponding to signals L*a*b*, whose values are mapped outside the gamut of signals CMY.

In other words, gamut mapping is performed with respect to the values of signals CMY within the gamut thereof so that the values correspond to signals L*a*b* which are mapped outside the gamut of signals CMY.

Figure 7:
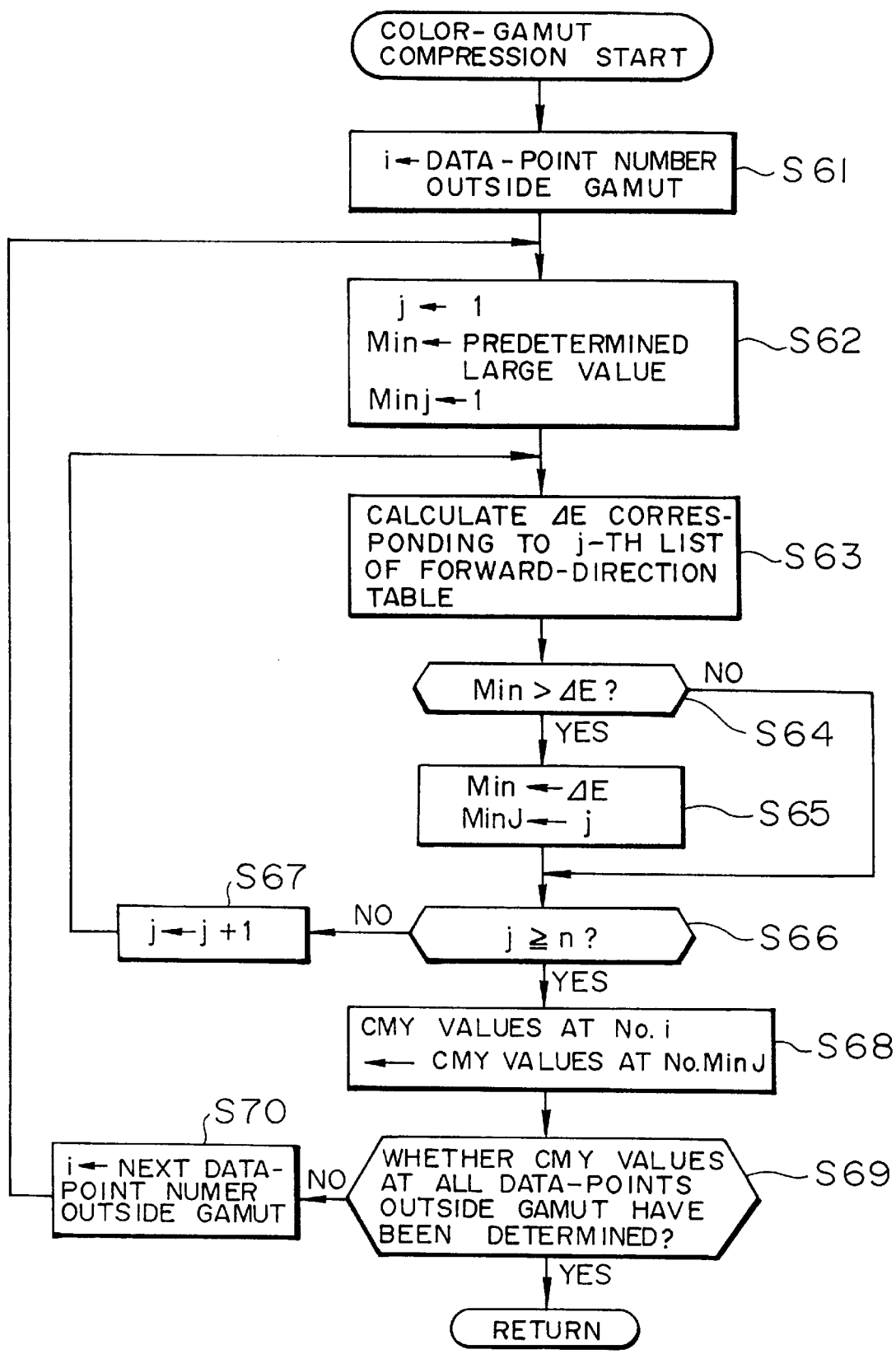
FIG. 7 is a flowchart illustrating a gamut mapping process.
Figure 9:
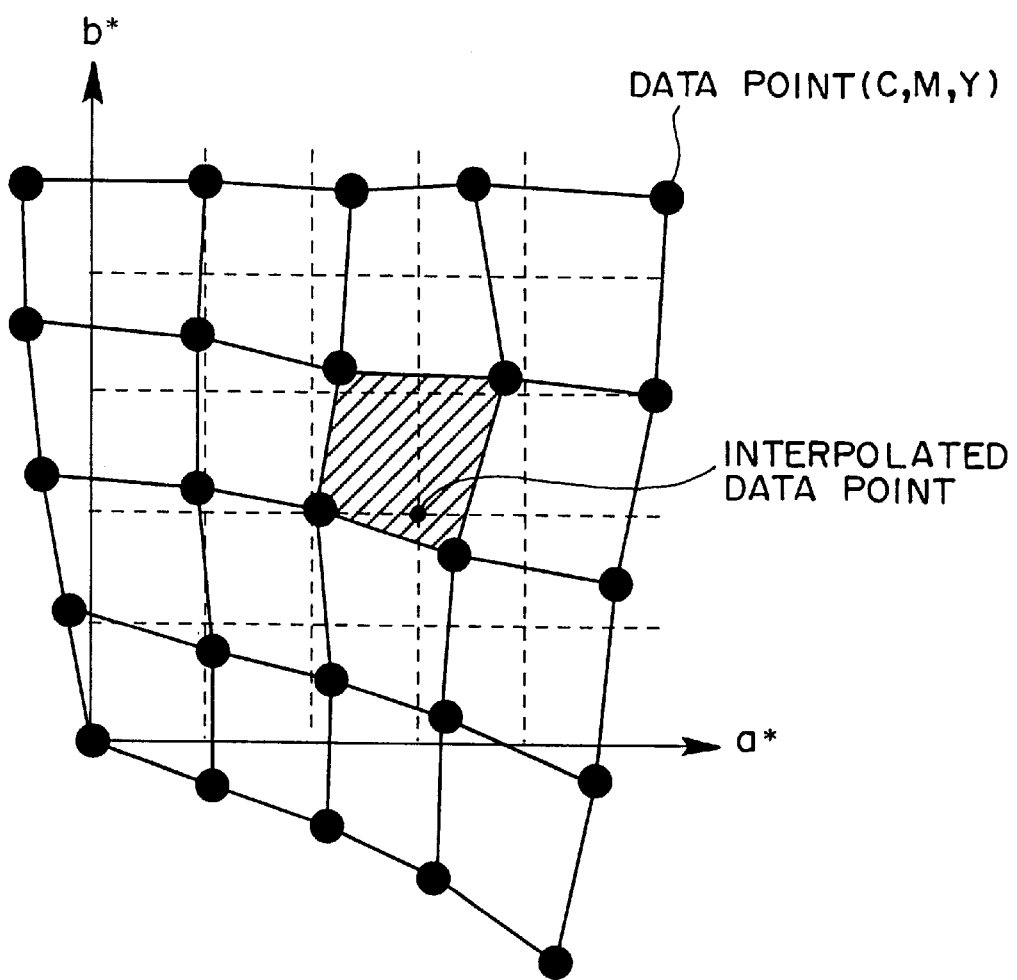
FIG. 9 is a chart showing an example of a data point interpolated on an a*–b* plane.

The flowchart in FIG. 7 shows the details of the gamut mapping process.

At first, in step S61, a number assigned for any data point among data points which are mapped outside the gamut of signals CMY is substituted for variable i.

Subsequently, in step S62, 1 is substituted for counter j for counting list numbers on the forward-direction table which is referred to, a predetermined large value as an initial value is substituted for variable Min which maintains the minimum value of a color-difference formula mentioned below, and 1 as an initial value is substituted for variable MinJ which memorizes the list number obtained when the value of the color-difference formula is minimized.

In step S63, the value ΔE of a color-difference formula expressed as the following numerical expression is calculated with reference to the j-th list of the forward-direction table.

$$\Delta E = \{(\Delta L^*/K_L)^2 + (\Delta C_{ab}^*/K_c)^2 + (\Delta H_{ab}^*/K_H)^2\}^{1/2}$$

where $K_L$, $K_c$ and $K_H$ are predetermined constants (compression coefficients), and $\Delta L^*$, $\Delta C_{ab}^*$ and $\Delta H_{ab}^*$ represent the lightness difference, the chroma difference and the hue difference between signals L*a*b* at data point i and the signals L*a*b* registered on the j-th list of the forward-direction table, respectively.

The lightness difference $\Delta L^*$, the chroma difference $\Delta C_{ab}^*$ and the hue difference $\Delta H_{ab}^*$ are calculated based on the following formulae, in which the values of signals L*a*b* at data point i are (L*out, a*out, b*out), and the values of signals L*a*b* registered on the j-th list of the forward-direction table are (L*in, a*in, b*in).

$\Delta L^* = L^*\text{out} - L^*\text{in}$ $\Delta C_{ab}^* = C^*\text{out} - C^*\text{in}$ $\Delta H_{ab}^*) = s \times \{2 \times (C^*\text{out} \times C^*\text{in} - a^*\text{out} \times a^*\text{in} - b^*\text{out} \times b^*\text{in})\}^{1/2}$ $C^*\text{out} = \{(a^*\text{out})^2 + (b^*\text{out})^2\}^{1/2}$ $C^*\text{in} = \{(a^*\text{in})^2 + (b^*\text{in})^2\}^{1/2}$ (When $a^*\text{out} \times b^*\text{in} \geq a^*\text{in} \times b^*\text{out}$) s=+1

(When $a^*\text{out} \times b^*\text{in} \leq a^*\text{in} \times b^*\text{out}$) s=−1

The smaller the value of the above color-difference formula, the smaller the perceptible difference between two colors.

Subsequently, in step S64, the process determines whether or not the value ΔE of the color-difference formula, calculated in step S63, is smaller than the value of variable Min. If the process has determined that the value ΔE is smaller, the value ΔE is substituted for variable Min, and the value of counter j at this time in step S65 is substituted for variable MinJ. If the process has determined that the value ΔE of the color-difference formula is the value of variable Min or greater, step S65 is skipped.

In step S66, the process determines whether or not the value ΔE of the color-difference formula has been checked as to the last list (the n-th list) of the forward-direction table, with reference to the value of counter j. If the process has determined that the check did not reach the last list, the value of counter j is incremented by 1 in step S67. Subsequently, the process returns to step S63 in which the ΔE of the color-difference formula is checked as to the subsequent list.

In the above manner the ΔE of the color-difference formula is checked as to all the lists of the forward-direction table. If, in step S66, the process has determined that the check reached the last list, it proceeds to step S68.

In step S68, the values of signals CMY on the forward-direction-table list whose number is represented by the value of variable MinJ are registered as the values of signals CMY at data point i outside the gamut.

In the subsequent step S69, the process determines whether or not the values of signals CMY have been registered as to all data points outside the gamut. If the process has determined that the values of signals CMY were registered as to all the data points, the making of the lookup table is completed, which terminates the process. If there is a data point at which the value of signals CMY have not been determined, the data point's number is set in variable i in step S70. Subsequently, back to step S62, the values of signals CMY at the data point are determined.

In the above manner, gamut mapping is performed with respect to a data point at which the value of the above color-difference formula is minimized. In addition, as described above, as shown in FIG. 8, on the lookup table are registered the values of signals CMY corresponding to signals L*a*b* in which, for example, the ranges of (L*, a*, b*) are 0 to 100, −128 to 128, and −128 to 128, respectively.

If the lookup table has a small number of data, the number of data may be increased by interpolation from surrounding data points.

The compression coefficients $K_L$, $K_C$ and $K_H$ in the above-described color-difference formula will be described below.

The compression coefficients $K_L$, $K_C$ and $K_H$ in the above-described color-difference formula are used such that the lightness difference $\Delta L^*$, the chroma difference $\Delta^* C_{ab}$ and the hue difference $\Delta H^*_{ab}$ are multiplied by reciprocals $1/K_L$, $1/K_C$ and $1/K_H$, respectively. Consequently, by increasing the values, the compression rate of the attribute (any of lightness, chroma and hue) corresponding to the compression coefficient can be increased.

In other words, increasing any one of the compression coefficients is close to one-dimensional compression, and increasing any two of the three is close to two-dimensional compression. For example, increasing the value of $K_L$ causes the compression direction to be close to the lightness direction. Increasing the value of $K_C$ causes the compression direction to be close to the chroma direction. And, increasing the value of $K_L$ and the value of $K_C$ mainly causes compression of lightness and chroma without greatly compressing hue.

In addition, giving 1 to all the values of the compression coefficients $K_L$, $K_C$ and $K_H$ causes the above color-difference formula to become a generally known color difference $\Delta E^*_{ab}$ as shown by the following formula:

$$\Delta E^* ab = \{(\Delta L^*)^2 + (\Delta C_{ab}^*)^2 + (\Delta H_{ab}^*)^2\}^{1/2}$$

Evaluation based on a visual experiment on such values of compression coefficients $K_L$, $K_C$ and $K_H$ was performed. Accordingly, the evaluation will be described.

The visual experiment was performed such that a CG image obtained by successively changing the compression coefficients ($K_L$, $K_C$, $K_H$) to (1, 1, 1), (2, 1, 1), (2, 2, 1), (1, 2, 1), (1, 2, 2), (1, 1, 2) and (2, 1, 2) was displayed on a monitor and was outputted by an ink-jet printer, and the image printed by the ink-jet printer was placed in a dark room so as not to be affected by outside light, and is compared by a predetermined number of persons to be tested.

In the visual experiment the monitor (GDM-2000TC produced by Sony Corporation) was disposed with respect to the person to be tested, and by centering the person to be tested, a light box was disposed at an angle of 90 degrees from the monitor. The white point of the monitor and the light source of the light box was set to D65. The brightness of the monitor was set to the reflection brightness of paper. In such a manner, by causing the absolute values of three stimulus values X, Y and Z to coincide under an identical light, conditions for causing color perception with respect to the monitor and the paper to coincide were determined.

The experiment was performed by a method of paired comparison in which, after an image displayed on the monitor was observed, two pictures disposed in the light box (which were outputted corresponding to different compression coefficient values) were observed, and from the two pictures one looking like the image displayed on the monitor was selected.

Figure 10:
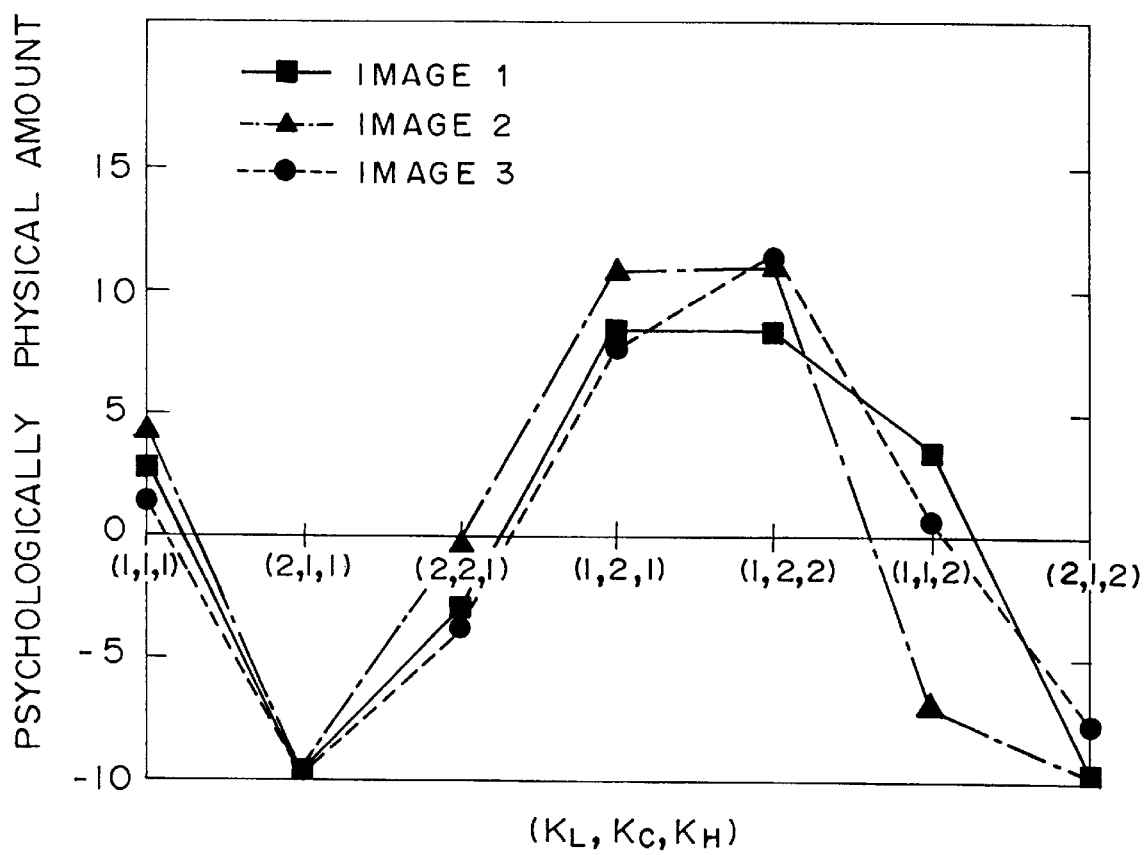
FIG. 10 is a graph showing an example of correspondences between compression coefficients and psychologically physical amounts.

FIG. 10 shows correspondences between compression coefficients and psychologically physical amounts, obtained when visual experiments were performed concerning three CG images for 24 persons to be tested (22 men and 2 women). On 46%, 33% and 75% of the whole CG images, colors outside the gamut of the printer were included.

As the psychologically physical amount increases, the person to be tested feels that the image displayed on the monitor looks like the picture outputted by the printer corresponding to its compression coefficients. In the correspondences shown in FIG. 10, when the values of compression coefficients $K_L$, $K_c$ and $K_H$ are expressed as ($K_L$, $K_C$, $K_H$)=(1, 2, 1) or (1, 2, 2), the psychologically physical amount is large. Thus, it is understood that the compression coefficients $K_L$, $K_c$ and $K_H$ preferably maintain the relationships: $K_c \geq K_H$ and $K_c \geq K_L$.

In the above manner, by using the above-described color-difference formula to perform optimal gamut mapping corresponding to a predetermined output device, color signals can be outputted.

Figure 2:
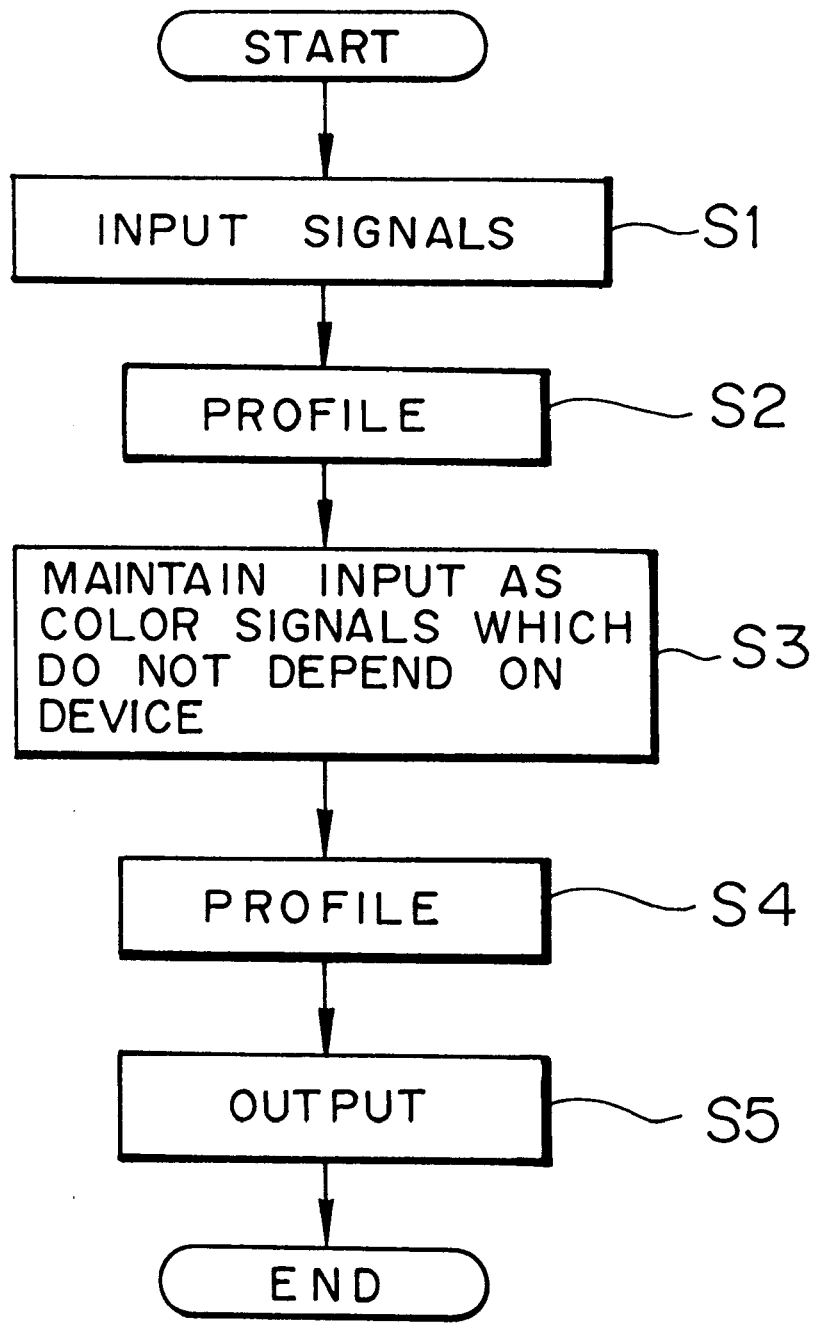
FIG. 2 is a flowchart illustrating a process performed by the image processing apparatus shown in FIG. 1.
Figure 11:
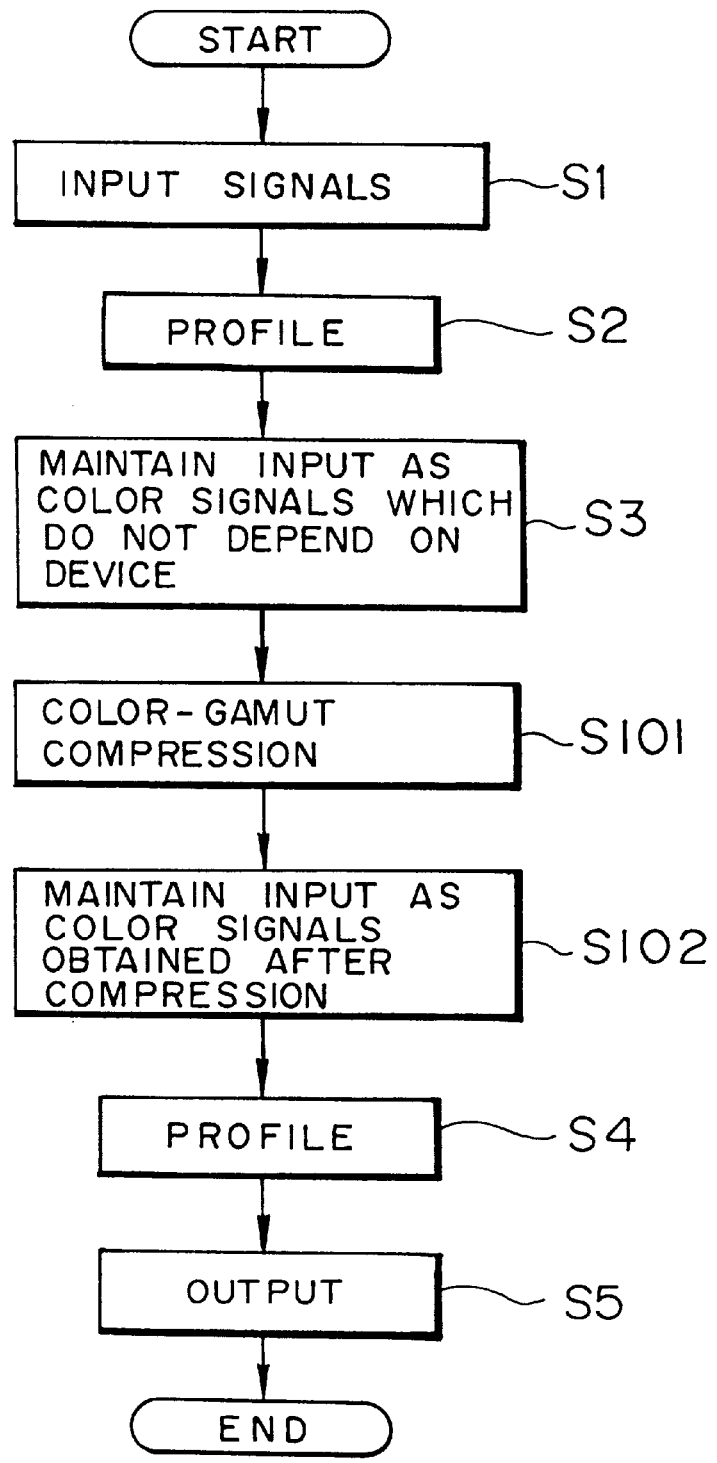
FIG. 11 is a flowchart illustrating another process performed by the image processing apparatus shown in FIG. 1.
Figure 12:
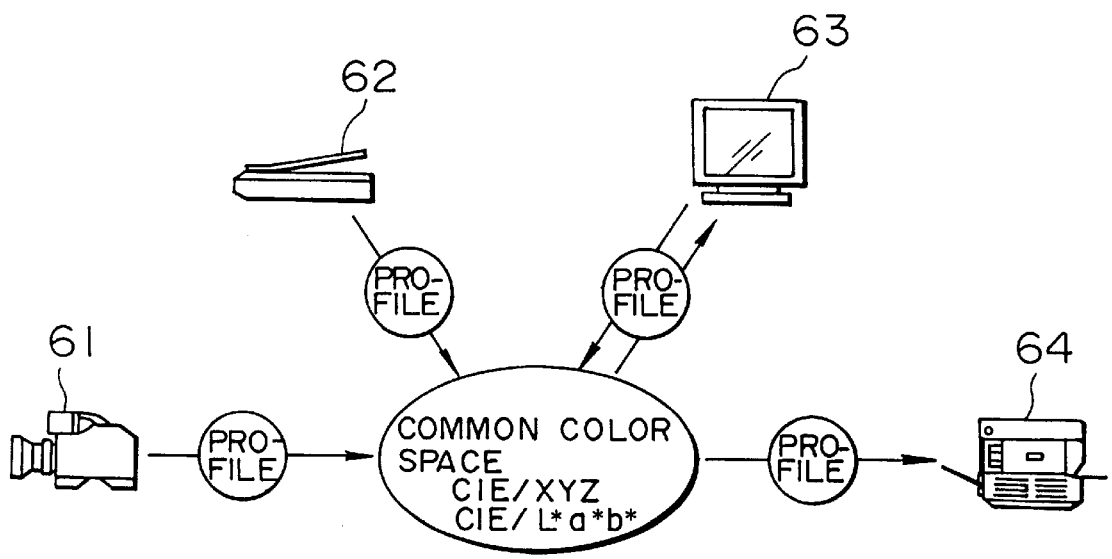
FIG. 12 is a chart illustrating the concept of a color management system.
Figure 13:
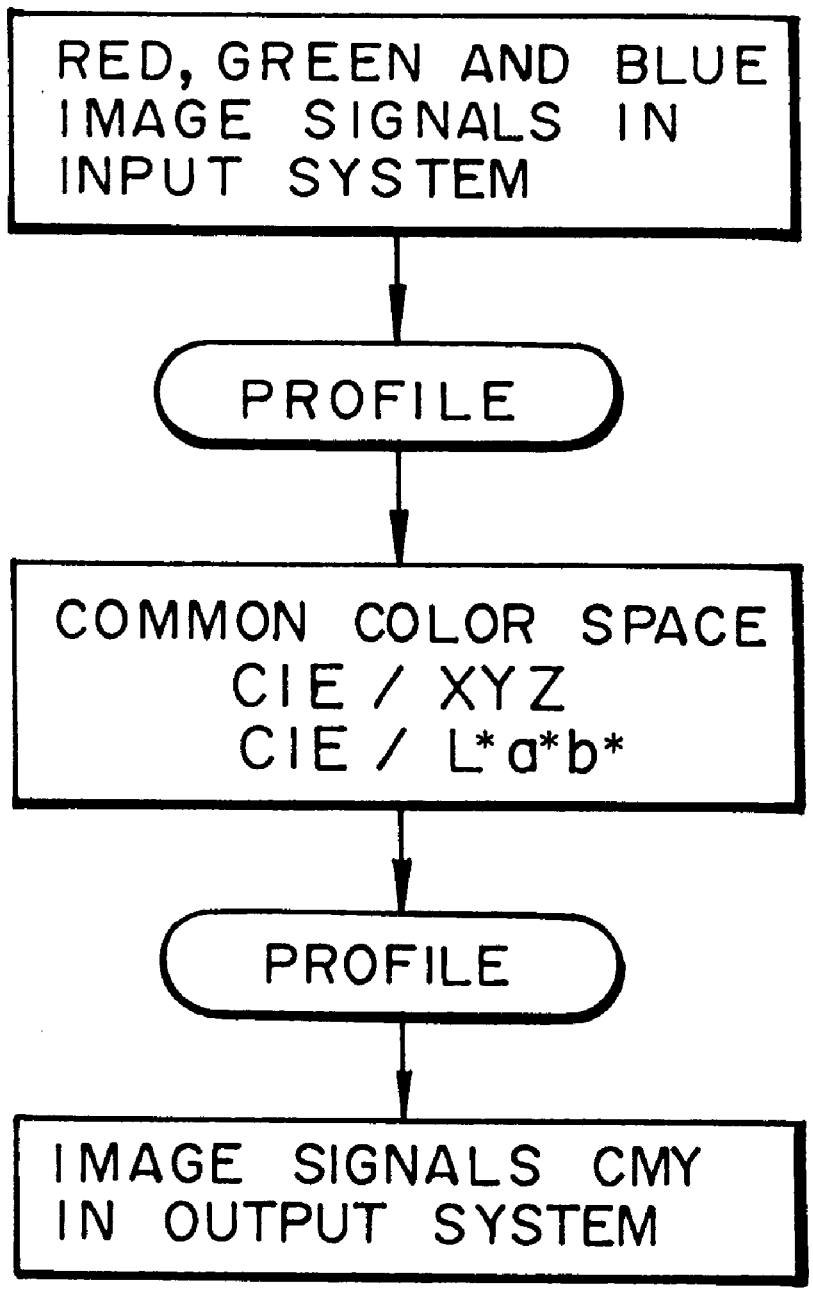
FIG. 13 is a chart illustrating a process for image processing in a color management system.
Figure 14:
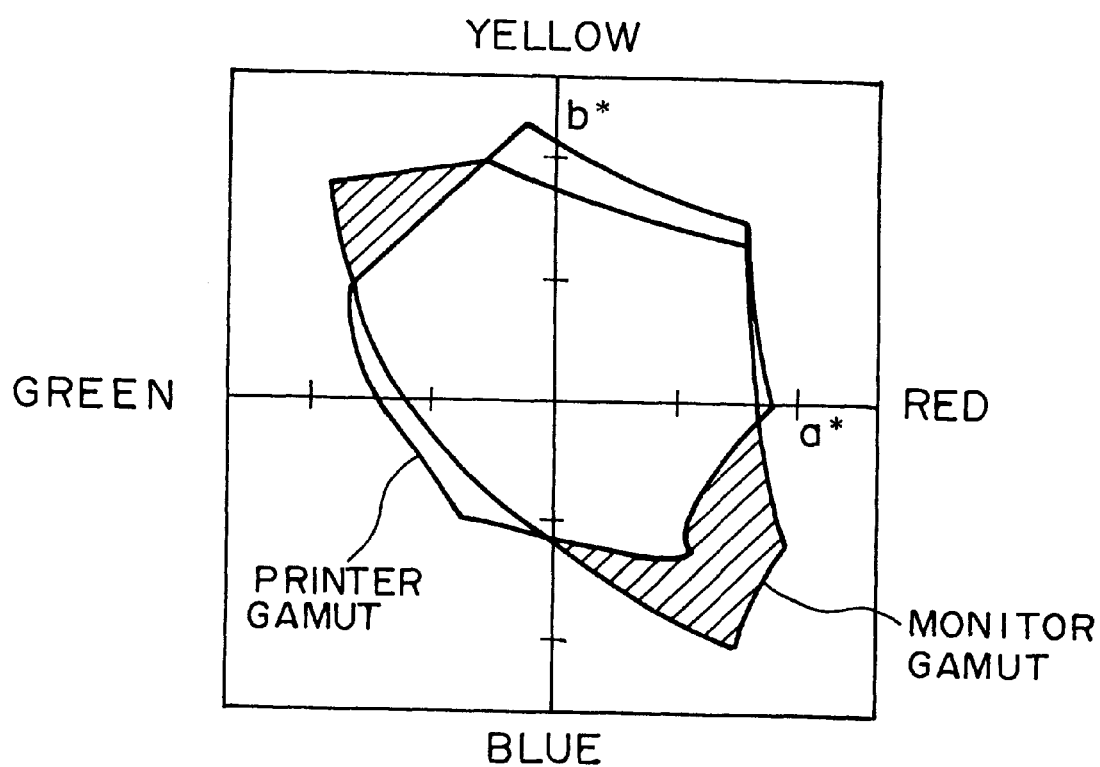
FIG. 14 is a chart showing an example of a monitor's color-reproduction range and an ink-jet printer's color-reproduction range on an a*–b* plane.
Figure 15:
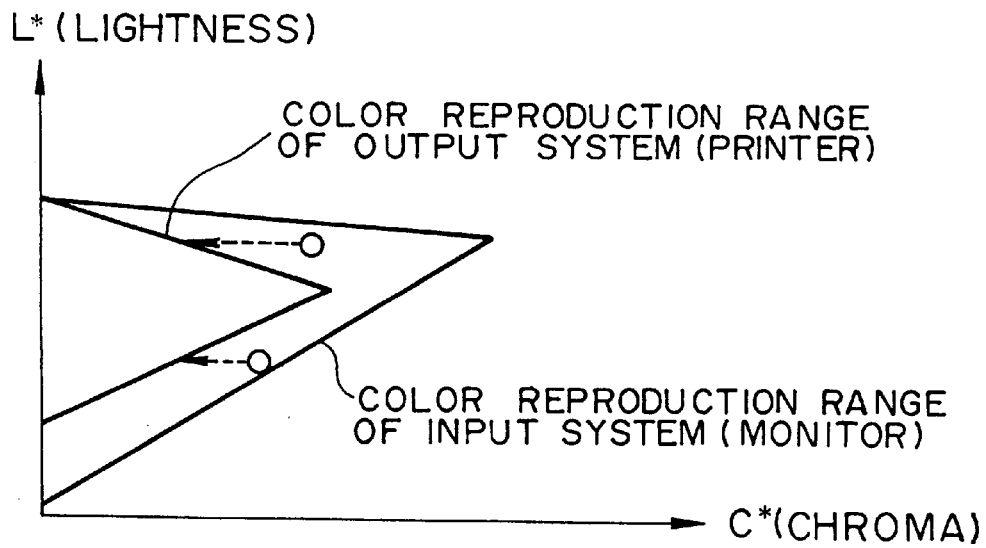
FIG. 15 is a chart showing an example of the compression direction in a conventional gamut mapping method.
Figure 16:
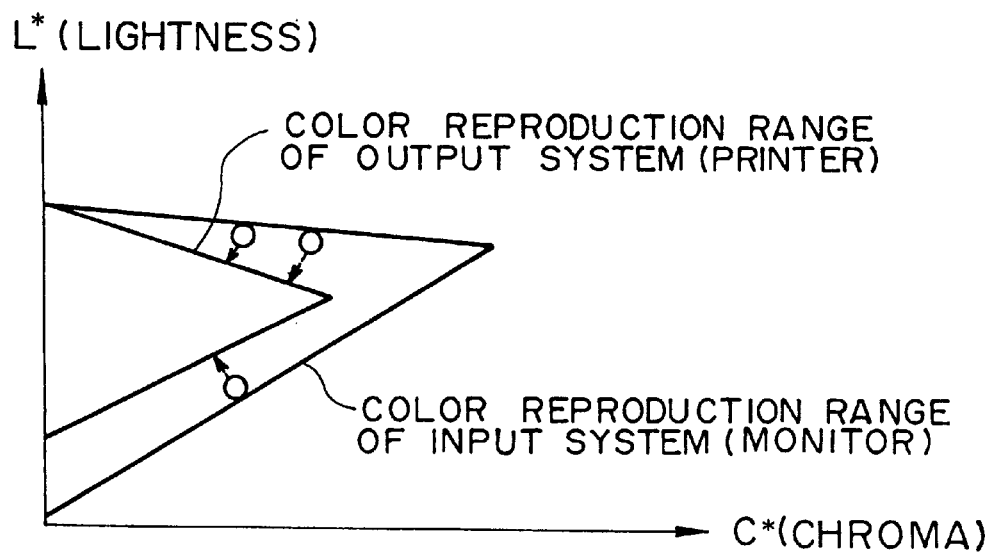
FIG. 16 is a chart showing another example of the compression direction in the conventional gamut mapping method.

In step S4 shown in FIG. 2, the image processing apparatus shown in FIG. 1 performs conversion (profile) by referring to the lookup table corresponding to the gamut mapping. However, as shown in FIG. 11, it is possible that gamut mapping is performed in step S101 within a space which does not depend on a device with respect to the color signals (obtained in step S3) which do not depend on the device, and in step S102, the color signals with color-gamut compression are maintained.

In addition, in the above embodiment the optimal gamut mapping is performed for the printer, however, gamut mapping may be similarly performed for another device.

What is claimed is:

1. An image processing apparatus for converting an image in an input system to an image corresponding to a color gamut obtained by an output system, the apparatus comprising:

an input system having an input system gamut to be converted;

an output signal having an output system gamut to be mapped with the input system gamut;

color-gamut mapping means, which performs color-gamut mapping with respect to color signals outside the output system gamut in the direction along which the value of the following color-difference formula is minimized:

$$\Delta E = \{(\Delta L^*/K_L)^2 + (\Delta C_{ab}^*/K_c)^2 + (\Delta H_{ab}^*/K_H)^2\}^{1/2}$$

where $\Delta L^*$, $\Delta C_{ab}^*$ and $\Delta H_{ab}^*$ represent a lightness difference, a chroma difference and a hue difference, respectively, between the input system gamut and the output system gamut, and wherein $K_L$, $K_c$ and $K_H$ represent predetermined constants having the following relationships: $K_c \geq K_H$ and $K_c \geq K_L$.

2. The apparatus of claim 1, wherein the input system inputs color R, G and B signals corresponding to red, green and blue signals, respectively, and wherein the apparatus further comprises a ROM for storing a lookup table such that the colorgamut mapping means converts CIE signals to CMY signals according to the lookup table.

3. The apparatus of claim 1, wherein the color-gamut mapping means performs gamut mapping in a device-independent color space and maintains color signals with color-gamut compression.

4. An image processing method for converting an image in an input system to an image corresponding to a color gamut obtained by an output system, comprising the steps of:

determining whether there is a difference between an input system gamut and an output system gamut;

performing gamut mapping with respect to color signals outside the output system gamut according to the following color-difference formula:

$$\Delta E = \{(\Delta L^*/K_L)^2 + (\Delta C_{ab}^*/K_c)^2 + (\Delta H_{ab}^*/K_H)^2\}^{1/2}$$

where $\Delta L^*$, $\Delta C_{ab}^*$ and $\Delta H_{ab}^*$ represent a lightness difference, a chroma difference and a hue difference, respectively, and $K_L$, $K_c$ and $K_H$ represent predetermined constants having the following relationships: $K_c \geq K_H$ and $K_c \geq K_L$; and minimizing the value of the color-difference formula.

5. The method of claim 4, further comprising the steps of:

inputting color R, G, and B signals corresponding to red, green, and blue signals, respectively;

converting the R, G, and B signals to device independent CIE signals;

converting the CIE signals to CMY signals by referring to a lookup table corresponding to the gamut mapping step.

6. The method o f claim 4, wherein the gamut mapping step is performed in a device-independent color space, and further comprising the step of maintaining color signals with color-gamut compression.

* * * * *

UNITED STATES PATENT AND TRADEMARK OFFICE
CERTIFICATE OF CORRECTION

| | |
|---|---|
| PATENT NO. | : 6,301,383 B1 |
| DATED | : October 9, 2001 |
| INVENTOR(S) | : Masahiko Ito; Naoya Katoh |

It is certified that error appears in the above-identified patent and that said Letters Patent is hereby corrected as shown below:

Column 8, claim 2,
Line 58, replace "colorgamut" with -- color-gamut --.

Column 10, claim 6,
Line 9, replace "o f" with -- of --.

Signed and Sealed this

Nineteenth Day of March, 2002

Attest:

JAMES E. ROGAN
Attesting Officer     Director of the United States Patent and Trademark Office